(12) United States Patent
Koch et al.

(10) Patent No.: US 11,303,136 B2
(45) Date of Patent: Apr. 12, 2022

(54) CELL-MOUNTED APPLICATION SPECIFIC INTEGRATED CIRCUITS FOR BATTERY SENSING

(71) Applicant: GM Global Technology Operations LLC, Detroit, MI (US)

(72) Inventors: Brian J. Koch, Berkley, MI (US); Pablo Valencia, Jr., Northville, MI (US); Alok Warey, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 430 days.

(21) Appl. No.: 16/410,400

(22) Filed: May 13, 2019

(65) Prior Publication Data

US 2020/0366112 A1  Nov. 19, 2020

(51) Int. Cl.
*H02J 7/00* (2006.01)
*B60L 58/10* (2019.01)
*H01M 10/42* (2006.01)

(52) U.S. Cl.
CPC ........ *H02J 7/00* (2013.01); *B60L 58/10* (2019.02); *H02J 7/007192* (2020.01); *H01M 10/4257* (2013.01); *H02J 2207/30* (2020.01)

(58) Field of Classification Search
CPC .... H02J 7/00; H02J 7/007192; H02J 2207/30; B60L 58/10; H01M 10/4257

USPC ......................................... 429/61–62, 90–92
See application file for complete search history.

(56) References Cited

U.S. PATENT DOCUMENTS

| | | | | |
|---|---|---|---|---|
| 10,050,315 | B2 * | 8/2018 | Kim | H01M 10/4257 |
| 10,050,316 | B2 * | 8/2018 | Keser | H01M 10/425 |
| 10,355,317 | B2 * | 7/2019 | Boovaragavan | H01M 10/0436 |
| 10,411,306 | B2 * | 9/2019 | Kim | H01M 10/482 |
| 2012/0242144 | A1 * | 9/2012 | Chorian | H01M 50/572 307/9.1 |
| 2018/0072159 | A1 * | 3/2018 | Wampler II | B60L 58/24 |
| 2019/0126770 | A1 * | 5/2019 | Koch | H01M 10/0445 |
| 2021/0247242 | A1 * | 8/2021 | Zhang | H01M 10/486 |

* cited by examiner

*Primary Examiner* — Richard V Muralidar
(74) *Attorney, Agent, or Firm* — Vivacqua Crane PLLC

(57) ABSTRACT

A cell-mounted application specific integrated circuit (ASIC) system for a vehicle includes a battery pack having multiple individual battery cells. An individual cell-mounted application specific integrated circuit (ASIC) is in communication with each of the individual battery cells, with the ASIC drawing power for operation directly from the individual battery cell. A battery control unit is in communication with the ASIC. A central electronics control unit is in communication with the ASIC. The ASIC communicates wirelessly with the battery control unit and the central electronics control unit.

19 Claims, 3 Drawing Sheets

CELL-MOUNTED APPLICATION SPECIFIC INTEGRATED CIRCUITS FOR BATTERY SENSING

INTRODUCTION

The present disclosure relates to vehicle battery cell charging and battery cell design, and in particular lithium-ion battery cell charging and lithium-ion battery design for electric powered vehicles.

Vehicle battery packs, particularly for lithium-based batteries, such as lithium-oxide batteries are susceptible to plating of metallic lithium (Li) during a battery charging process. Lithium plating occurs during fast charging of the battery pack and also at low temperature environmental conditions when a temperature of the battery pack is below an optimum operating temperature range defined between approximately 25 to 35 degrees Centigrade. Lithium plating during charging is of particular concern when battery temperature is 10 degrees Centigrade or lower. Lithium plating is also of concern during battery fast charging operation, defined as charging in approximately 30 minutes or less. Lithium plating is particularly prevalent during fast charging operation and when the battery pack is at or below 10 degrees Centigrade. Plating of metallic lithium can induce lithium-ion (Li-ion) battery cell degradation or battery cell failure, which are a failure mechanism and an operating concern for an electric powered vehicle.

Collection of cell operating conditions is presently performed using sensors such as temperature sensors, strain sensors and reference electrodes positioned in a battery cell bay. This data is not always available for each battery cell and depending on the operating state of the vehicle.

Thus, while current vehicle battery cell data collection systems achieve their intended purpose, there is a need for a new and improved system and method for sensing and reporting vehicle battery cell status.

SUMMARY

According to several aspects, a cell-mounted application specific integrated circuit (ASIC) system for a vehicle includes a battery pack having multiple individual battery cells. An individual cell-mounted application specific integrated circuit (ASIC) is provided with each individual battery cell of the battery pack, the ASIC drawing power for operation directly from the individual battery cell. A sensor collects data of the individual battery cell and forwards the data to the ASIC.

In another aspect of the present disclosure, the battery cells individually include a positive power tab and a negative power tab.

In another aspect of the present disclosure, the ASIC includes a positive power connection connected to the positive power tab and from a negative power connection connected to the negative power tab.

In another aspect of the present disclosure, the ASIC and the sensor are incorporated in an ASIC assembly sensing information for control and diagnosis of the battery pack.

In another aspect of the present disclosure, the sensor includes a reference electrode drawing power for operation directly from a positive reference electrode connection connected to the positive power tab, and from a negative reference electrode connection connected to the negative power tab.

In another aspect of the present disclosure, the sensor includes one of a strain gage and a magnetic sensor receiving data directly from the battery cell and communicating an output signal via the ASIC.

In another aspect of the present disclosure, the sensor includes a temperature gage collecting a battery cell temperature which is directly connected to the battery cell and communicates an output signal via the ASIC.

In another aspect of the present disclosure, the ASIC is installed as part of an individual cell manufacturing process and remains with the battery cell throughout a life of the battery cell, the ASIC managing the sensor including switching sensor power on and off, checking sensor measurements received as sensor signals against reference values, and adjusting offsets to maintain reproducible operation of the sensor.

In another aspect of the present disclosure, a battery control unit identifies when a low temperature condition is present and when a high charging rate condition is present.

In another aspect of the present disclosure, the low temperature condition defines a battery temperature below 25 degrees centigrade and wherein the high charging rate condition defines a charging rate above a predetermined current or above a predetermined charging rate (Amp-hr) for a predetermined period of time.

According to several aspects, a cell-mounted application specific integrated circuit (ASIC) system for a vehicle includes a battery pack having multiple individual battery cells. An individual cell-mounted application specific integrated circuit (ASIC) is in communication with each of the individual battery cells, with the ASIC drawing power for operation directly from the individual battery cell. A battery control unit is in communication with the ASIC. A central electronics control unit in communication with the ASIC. The ASIC communicates wirelessly with the battery control unit and the central electronics control unit.

In another aspect of the present disclosure, the battery cells individually include a positive power tab and a negative power tab, the ASIC mounted on one of the positive power tab or the negative power tab.

In another aspect of the present disclosure, one of the positive power tab or the negative power tab functions as an antenna to wirelessly transmit information from the ASIC.

In another aspect of the present disclosure, the battery cells include an internally mounted antenna which wirelessly transmits ASIC collected data through the battery pack.

In another aspect of the present disclosure, a battery housing containing the battery cells, wherein a metal of the battery housing functions as an antenna for wireless transmission of data from the ASIC.

In another aspect of the present disclosure, the ASIC is mounted on an outer rim of the battery cell.

In another aspect of the present disclosure, the ASIC is mounted directly to a face of the battery cell.

According to several aspects, a cell-mounted application specific integrated circuit (ASIC) system for a vehicle includes a battery pack having multiple individual battery cells. The battery cells individually include a positive power tab and a negative power tab. An individual cell-mounted application specific integrated circuit (ASIC) is in communication with each of the individual battery cells and receives power for operation of the ASIC from the positive power tab and the negative power tab, with the ASIC drawing power for operation directly from the individual battery cell. Multiple sensors are in communication with the ASIC, the sensors collecting data of the individual battery cell and forwarding the data to the ASIC. The ASIC manages the sensors including switching sensor power on and off, checking measurements of the sensors received as sensor signals against reference values, and adjusting offsets to maintain reproducible operation of the sensors. A control unit is in wireless communication with the ASIC receiving the data from the ASIC.

In another aspect of the present disclosure, the control unit defines a battery control unit monitoring conditions including voltage, temperature and charging rate within the individual battery cells of the battery pack.

In another aspect of the present disclosure, the control unit defines a central electronics control unit controlling functions of a vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
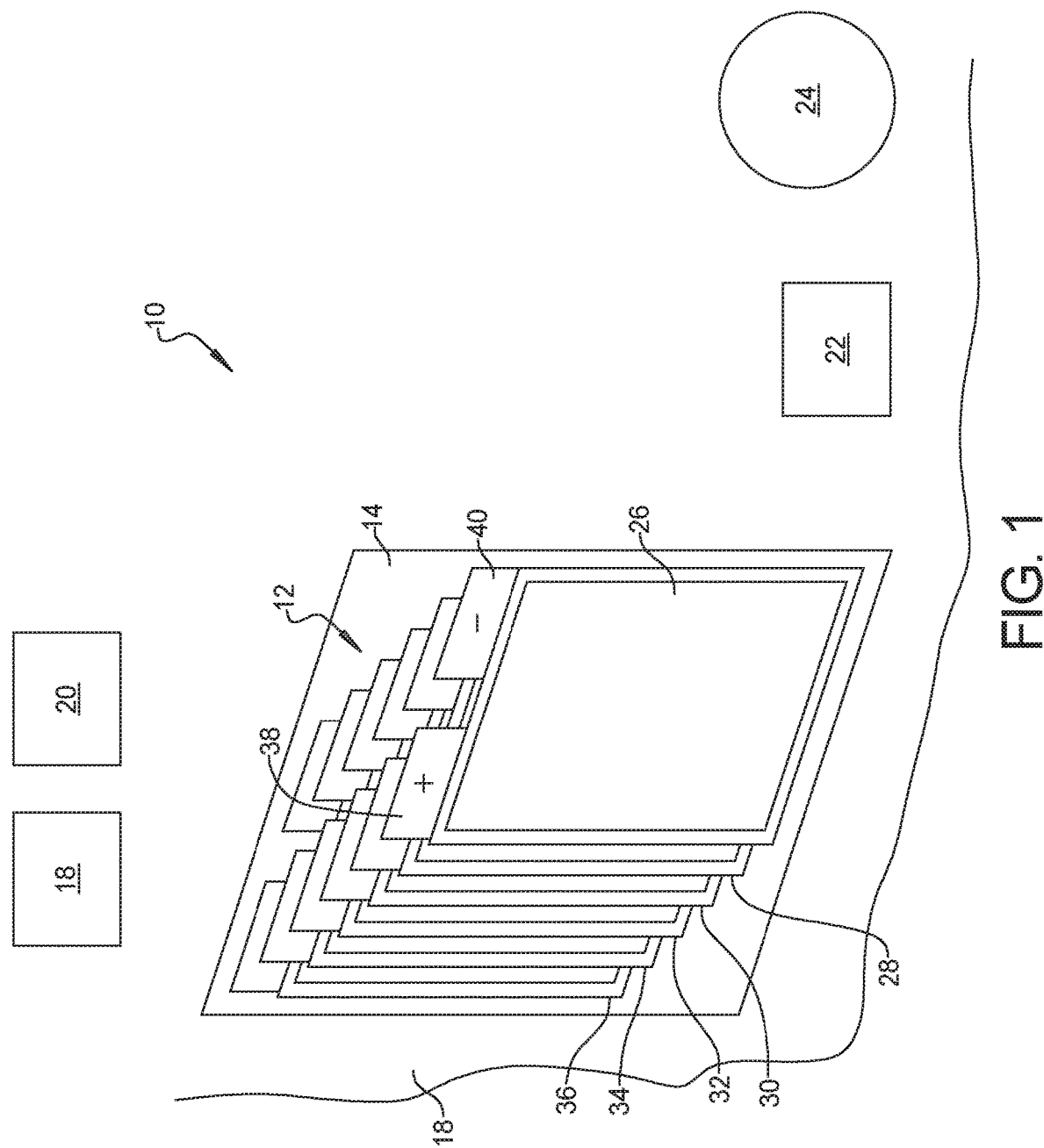
FIG. 1 is a diagrammatic presentation of a cell-mounted application specific integrated circuit system according to an exemplary aspect.

Referring to FIG. 1, a cell-mounted application specific integrated circuit, hereinafter (ASIC) system 10 includes a battery pack 12 which is contained in a battery housing 14 of an electrically powered vehicle 16. The cell-mounted ASIC system 10 communicates state conditions of multiple battery cells as electronic signals to multiple controllers such as a battery control unit 18 which monitors conditions such as voltage, temperature, charging rate and the like within the individual battery cells of the battery pack 12 and for the battery pack 12 in its entirety, and a central electronics control unit (ECU) 20 which controls functions of the vehicle 16. Power from the battery pack 12 is used to energize one or more electrical drive motors 22 which are connected to and provide operational power to at least one driven wheel 24 of the vehicle 16.

The battery pack 12 contains multiple substantially identical battery cells arranged in a sequential array. These include but are not limited to exemplary battery cells 26, 28, 30, 32, 34, 36. The battery cells such as exemplary battery cell 26 include power collection tabs including a positive power tab 28 and a negative power tab 40. Individual tabs can be interconnected in series or in parallel using one or more connecting plates (not shown) defining terminals which provide a predetermined nominal output voltage from the battery pack 12 and provide for current draw from the battery pack 12.

The battery pack 12 has an optimum operating temperature range between approximately 25 degrees Centigrade up to approximately 35 degrees Centigrade. Operation at temperatures below the optimum temperature range can produce lithium plating within the battery cells. To mitigate against lithium plating, the battery control unit 18 identifies when a low temperature condition, i.e., below 25 degrees Centigrade, is present and/or when a high charging rate condition is present which can also indicate that lithium plating can occur within the battery cells. The low temperature condition is defined as a battery pack temperature or individual battery cell temperatures below a predetermined threshold temperature, for example below approximately 25 degrees Centigrade. The high charging rate condition is defined as a battery pack charging rate above a predetermined current or above a predetermined charging rate (Amp-hr) for a predetermined period of time. A high charging rate is present when a full charge or at least approximately an 80% battery charge is achieved in approximately 30 minutes or less. Conditions when both the low temperature condition and the high charging rate condition are simultaneously present can therefore also lead to lithium plating.

Referring to FIG. 2 and again to FIG. 1, to enhance data collection capability for the battery pack 12, individual cell-mounted application specific integrated circuits (ASICs) 42 are provided in individual battery cells of the battery pack 12 such as in exemplary battery cell 26. The ASICs 42 draw power for their operation directly from a positive power connection 44 connected to the positive power tab 38, and from a negative power connection 46 connected to the negative power tab 40. Additional sensors are incorporated as part of an ASIC assembly defined by an ASIC 42 plus one or more sensors which are capable of sensing information that is pertinent to control and diagnosis of the battery pack 12. According to several aspects the sensors include a reference electrode 48 which draws power for operation directly from a positive reference electrode connection 50 connected to the positive power tab 38, and from a negative reference electrode connection 52 connected to the negative power tab 40. The reference electrode 48 is an electrode having a known accurately maintained potential and is stable and is used as a reference for measurement by other electrodes. Additional sensors 54 which can include a strain gage, a magnetic sensor and the like receive data directly from the battery cell 26 and communicate an output signal via the ASIC 42. Battery cell temperature is collected by a temperature gage 56 also directly connected to the battery cell 26 which communicates its output signal via the ASIC 42.

The ASICs 42 and their associated sensors are self-contained as part of individual cell assemblies and draw operating power from the battery cell associated with the ASIC 42 in order to function to collect cell information. The ASICs 42 communicate individual cell information to the controllers such as to the battery control unit 18 and the ECU 20 discussed above that execute state estimation and control functions. According to several aspects, individual ASICs 42 are installed as part of an individual cell manufacturing process and remain with the same battery cell throughout a life of the battery cell. The ASICs are preprogrammed to manage the associated sensors in a variety of ways, such as switching sensor power on and off, checking sensor measurements received as sensor signals against reference values, and adjusting offsets to maintain reproducible operation of the sensors.

Figure 2:
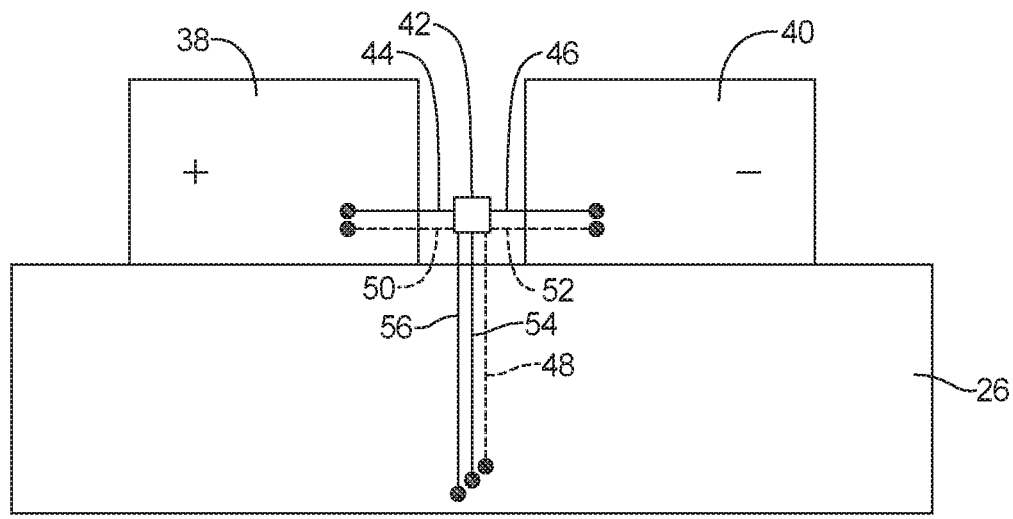
FIG. 2 is a front elevational view of a portion of a battery cell of the system of FIG. 1.

Referring to FIG. 3 and again to FIGS. 1 and 2, an ASIC 42 can be located at multiple different positions outside of a battery cell package such as exemplary battery cell 26 or positioned within the battery housing 14. For example, an ASIC 42a is mounted on an outer rim 58 of the battery cell 26, an ASIC 42b is mounted on one of the power tabs such as the negative power tab 40, or an ASIC 42c is mounted directly to a face 60 of the battery cell 26. According to other aspects, an ASIC 42d is positioned outside of the battery cell package and within the battery housing 14 and remotely connected to the battery cell 26, for example by hardwiring the ASIC 42d, or the ASIC 42d can communicate through use of a wireless transmission device.

Figure 3:
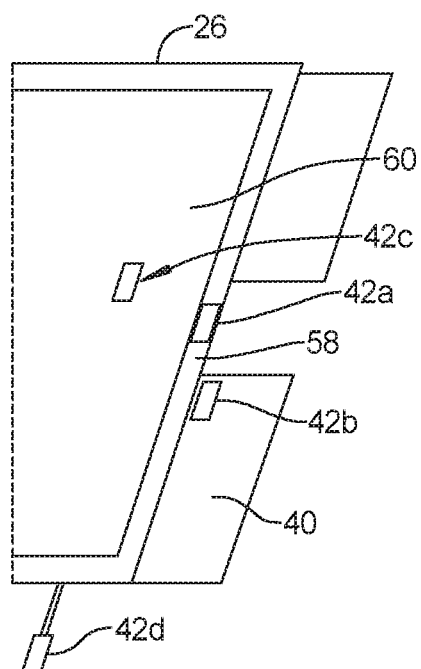
FIG. 3 is a top perspective view of another aspect of a battery cell modified from FIG. 2.
Figure 4:
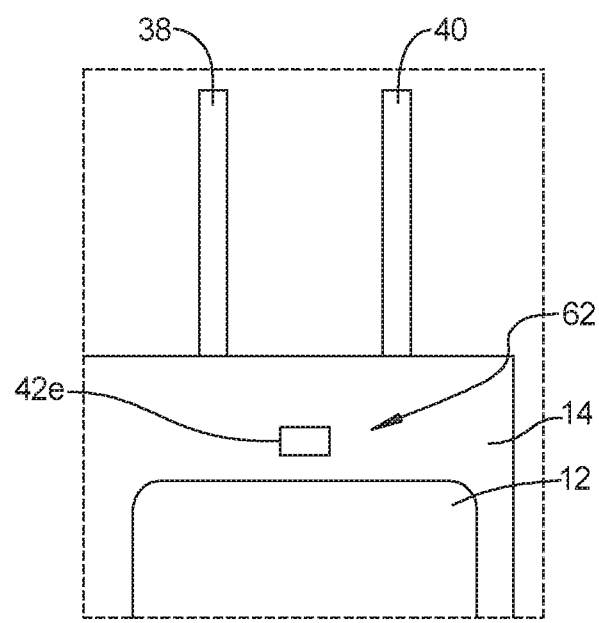
FIG. 4 is a front elevational view of another aspect of a battery cell modified from FIG. 2.
Figure 5:
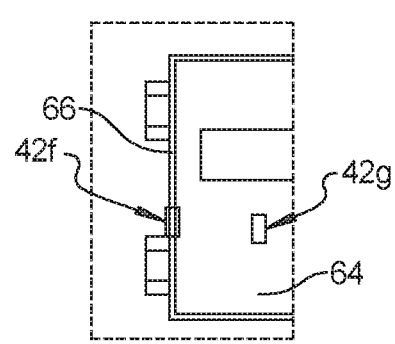
FIG. 5 is a front elevational view of another aspect of a battery cell modified from FIG. 2.
Figure 6:
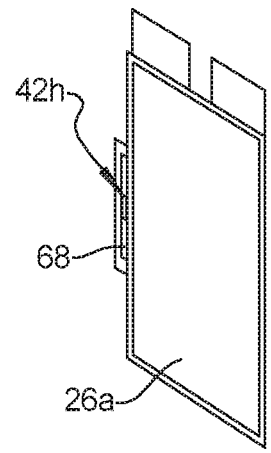
FIG. 6 is a front perspective view of another aspect of a battery cell modified from FIG. 2.

Referring to FIGS. 4, 5 and 6 and again to FIGS. 2 and 3, an ASIC 42 can be located at multiple different positions inside of a battery cell package. With specific reference to FIG. 4, an ASIC 42e is mounted in a headspace 62 above the battery pack 12 within the battery housing 14 and between the positive power tab 38 and the negative power tab 40.

With specific reference to FIG. 5 and again to FIGS. 1 through 4, an ASIC 42f is mounted inside of a battery cell package on a battery cell stack 64. An ASIC 42g is mounted inside of a battery cell package on an edge 66 of a separator.

With specific reference to FIG. 6 and again to FIGS. 1 through 5, an ASIC 42h is mounted inside of a battery cell package and within a compartment 68 designed into a modified battery cell 26a. The compartment 68 and therefore the ASIC 42h can be sealed or unsealed with respect to an electrolyte of the battery cell 26a.

Figure 7:
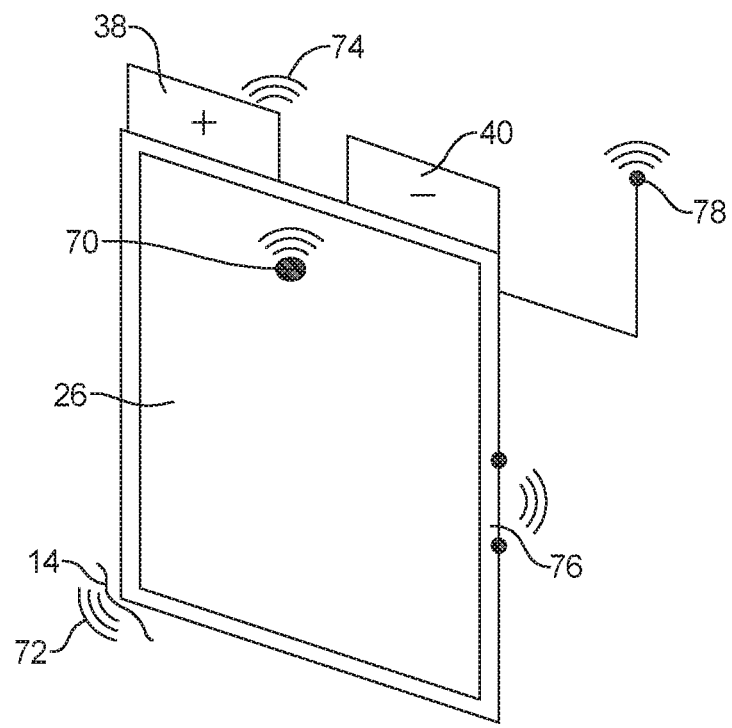
FIG. 7 is a front perspective view of another aspect of a battery cell modified from FIG. 2.

With reference to FIG. 7 and again to FIG. 1, ASICs of the present disclosure can communicate wirelessly with the various controllers such as the battery control unit 18 and the central electronics control unit (ECU) 20. The battery cells such as exemplary battery cell 26 can include an internally mounted antenna 70 which wirelessly transmits ASIC collected data through the battery pack 12 and the battery housing 14. Metal of the battery housing 14 can also function as an antenna 72. One of the positive power tab 38 or the negative power tab 40 can also function as an antenna 74. A battery cell externally mounted antenna 76 can also be provided. In addition, a remote antenna 78 can be provided.

A cell-mounted application specific integrated circuit (ASIC) system of the present disclosure offers several advantages. These include an ASIC and sensors which are self-contained as part of a battery cell assembly. The ASIC draws power from the battery cell in order to function to collect cell information and communicate it to controllers that execute state estimation and control functions. The ASIC manages the sensors in a variety of ways, such as switching power, checking sensor measurements from sensor received signals against reference values saved for example in a memory of the ASIC and adjusting offsets. The ASIC can be installed as part of the cell manufacturing process and remains with the same cell throughout its life. The ASIC is connected to internal cell components and the ASIC provides information that was previously unavailable to enhance fast charge capability, cell utilization, and diagnostic capability. A wireless aspect of the ASIC can be contained entirely within the battery cell.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cell-mounted application specific integrated circuit (ASIC) system for a vehicle, comprising:
    a battery pack having a battery cell;
    a cell-mounted application specific integrated circuit (ASIC) provided with the battery cell of the battery pack, the ASIC drawing power for operation directly from the battery cell; and
    a sensor collecting data of the battery cell and forwarding the data to the ASIC, and
    wherein the ASIC is installed as part of a battery cell manufacturing process and remains with the battery cell throughout a life of the battery cell, the ASIC managing the sensor including switching sensor power on and off, checking sensor measurements received as sensor signals against reference values, and adjusting offsets to maintain reproducible operation of the sensor.

2. The cell-mounted application specific integrated circuit (ASIC) system for the vehicle of claim 1, wherein the battery cell includes a positive power tab and a negative power tab.

3. The cell-mounted application specific integrated circuit (ASIC) system for the vehicle of claim 2, wherein the ASIC includes a positive power connection connected to the positive power tab and from a negative power connection connected to the negative power tab.

4. The cell-mounted application specific integrated circuit (ASIC) system for the vehicle of claim 2, wherein the sensor includes a reference electrode drawing power for operation directly from a positive reference electrode connection connected to the positive power tab, and from a negative reference electrode connection connected to the negative power tab.

5. The cell-mounted application specific integrated circuit (ASIC) system for the vehicle of claim 1, wherein the ASIC and the sensor are incorporated in an ASIC assembly sensing information for control and diagnosis of the battery pack.

6. The cell-mounted application specific integrated circuit (ASIC) system for the vehicle of claim 1, wherein the sensor includes one of a strain gage and a magnetic sensor receiving data directly from the battery cell and communicating an output signal via the ASIC.

7. The cell-mounted application specific integrated circuit (ASIC) system for the vehicle of claim 1, wherein the sensor includes a temperature gage collecting a battery cell temperature which is directly connected to the battery cell and communicates an output signal via the ASIC.

8. The cell-mounted application specific integrated circuit (ASIC) system for the vehicle of claim 1, further including a battery control unit identifying when a low temperature condition is present and when a high charging rate condition is present.

9. The cell-mounted application specific integrated circuit (ASIC) system for the vehicle of claim 8, wherein the low temperature condition defines a battery temperature below 25 degrees centigrade and wherein the high charging rate condition defines a charging rate above a predetermined current or above a predetermined charging rate (Amp-hr) for a predetermined period of time.

10. A cell-mounted application specific integrated circuit (ASIC) system for a vehicle, comprising:
    a battery pack having a battery cell;

an individual cell-mounted application specific integrated circuit (ASIC) in communication with the battery cell, with the ASIC drawing power for operation directly from the battery cell;
a battery control unit in communication with the ASIC;
a central electronics control unit in communication with the ASIC; and
wherein the ASIC communicates wirelessly with the battery control unit and the central electronics control unit.

11. The cell-mounted application specific integrated circuit (ASIC) system for the vehicle of claim 10, wherein the battery cell includes a positive power tab and a negative power tab, the ASIC mounted on one of the positive power tab or the negative power tab.

12. The cell-mounted application specific integrated circuit (ASIC) system for the vehicle of claim 11, wherein one of the positive power tab or the negative power tab functions as an antenna to wirelessly transmit information from the ASIC.

13. The cell-mounted application specific integrated circuit (ASIC) system for the vehicle of claim 10, wherein the battery cell includes an internally mounted antenna which wirelessly transmits ASIC collected data through the battery pack.

14. The cell-mounted application specific integrated circuit (ASIC) system for the vehicle of claim 10, further including a battery housing containing the battery cell, wherein a metal of the battery housing functions as an antenna for wireless transmission of data from the ASIC.

15. The cell-mounted application specific integrated circuit (ASIC) system for the vehicle of claim 10, wherein the ASIC is mounted on an outer rim of the battery cell.

16. The cell-mounted application specific integrated circuit (ASIC) system for the vehicle of claim 10, wherein the ASIC is mounted directly to a face of the battery cell.

17. A cell-mounted application specific integrated circuit (ASIC) system for a vehicle, comprising:
a battery pack having multiple individual battery cells;
the battery cells individually include a positive power tab and a negative power tab;
an cell-mounted application specific integrated circuit (ASIC) in communication with individual ones of the battery cells and receiving power for operation of the ASIC from the positive power tab and the negative power tab, with the ASIC drawing power for operation directly from the individual ones of the battery cells;
multiple sensors in communication with the ASIC, the sensors collecting data of the individual battery cells and forwarding the data to the ASIC;
the ASIC managing the sensors including switching sensor power on and off, checking measurements of the sensors received as sensor signals against reference values, and adjusting offsets to maintain reproducible operation of the sensors; and
a control unit in wireless communication with the ASIC receiving the data from the ASIC.

18. The cell-mounted application specific integrated circuit (ASIC) system for the vehicle of claim 17, wherein the control unit defines a battery control unit monitoring conditions including voltage, temperature and charging rate within the individual battery cells of the battery pack.

19. The cell-mounted application specific integrated circuit (ASIC) system for the vehicle of claim 17, wherein the control unit defines a central electronics control unit controlling functions of the vehicle.

* * * * *